(12) United States Patent
Vicidomini et al.

(10) Patent No.: US 11,422,348 B2
(45) Date of Patent: Aug. 23, 2022

(54) TIME-RESOLVED IMAGING METHOD WITH HIGH SPATIAL RESOLUTION

(71) Applicants: FONDAZIONE ISTITUTO ITALIANO DI TECNOLOGIA, Genoa (IT); POLITECNICO DI MILANO, Milan (IT); UNIVERSITA' DEGLI STUDI DIGENOVA, Genoa (IT)

(72) Inventors: Giuseppe Vicidomini, Genoa (IT); Marco Castello, Genoa (IT); Giorgio Tortarolo, Genoa (IT); Alberto Tosi, Paruzzaro (IT); Mauro Buttafava, Sarmato (IT); Federica Villa, Milan (IT); Paolo Bianchini, Genoa (IT); Alberto Diaspro, Genoa (IT); Colin J. R. Sheppard, Wollongong (AU)

(73) Assignees: FONDAZIONE ISTITUTO ITALIANO DI TECNOLOGIA, Genoa (IT); POLITECNICO DI MILANO, Milan (IT); UNIVERSITA' DEGLI STUDI DIGENOVA, Genoa (IT)

( * ) Notice: Subject to any disclaimer, the term of this patent is extended or adjusted under 35 U.S.C. 154(b) by 149 days.

(21) Appl. No.: 16/961,819

(22) PCT Filed: Jan. 24, 2019

(86) PCT No.: PCT/IB2019/050595
§ 371 (c)(1),
(2) Date: Jul. 13, 2020

(87) PCT Pub. No.: WO2019/145889
PCT Pub. Date: Aug. 1, 2019

(65) Prior Publication Data
US 2020/0386974 A1 Dec. 10, 2020

(30) Foreign Application Priority Data

Jan. 25, 2018 (IT) .................... 102018000001891

(51) Int. Cl.
*G02B 21/06* (2006.01)
*G02B 21/00* (2006.01)
*G02B 27/58* (2006.01)

(52) U.S. Cl.
CPC ....... *G02B 21/008* (2013.01); *G02B 21/0028* (2013.01); *G02B 21/0036* (2013.01); *G02B 27/58* (2013.01)

(58) Field of Classification Search
CPC .............. G02B 21/008; G02B 21/0028; G02B 21/0036; G02B 27/58; G02B 21/00;
(Continued)

(56) References Cited

U.S. PATENT DOCUMENTS 4,549,204 A 10/1985 Bertero et al.
10,746,657 B2 * 8/2020 Bathe .................... G06T 5/50
(Continued)

FOREIGN PATENT DOCUMENTS

DE   102012023024 A1   5/2014
EP       2317362 A1    5/2011
WO    2015055534 A1    4/2015

OTHER PUBLICATIONS

International Search Report, issued in PCT/IB2019/050595, dated Mar. 28, 2019, Rijswijk, Netherlands.
(Continued)

*Primary Examiner* — Arnel C Lavarias
(74) *Attorney, Agent, or Firm* — ArentFox Schiff LLP; Michael Fainberg

(57) ABSTRACT

A method for operating a point laser-scanning microscope includes scanning a sample with a focused illumination laser beam; recording a plurality of images by detecting elements
(Continued)

being configurable to an intensity mode, in which the recorded images are intensity images $g_{i,j}(n)$ related to photons collected during an entire dwell time of the illumination beam on an individual position n, or to a time-resolved mode, in which the recorded images are time-resolved images $g_{i,j}{}^t(n, t)$, the collected photons being discriminated based on their arrival times to individual detecting elements; calculating a fingerprint image a by summing the plurality of intensity images $g_{i,j}(n)$ over all positions n; estimating shift matrices $s^x$ and $s^y$ from the intensity images $g_{i,j}(n)$; reconstructing at least one of a time-resolved object function $f^t$ and an intensity object function f; and visualizing at least one of a high-resolution time-resolved image $f^{t\sim}$ and a high-resolution intensity image $f^\sim$.

9 Claims, 4 Drawing Sheets

(58) Field of Classification Search
CPC .............. G02B 21/0004; G02B 21/002; G02B 21/0024; G02B 21/0032; G02B 21/0052; G02B 21/0072; G02B 21/0076; G02B 21/0084; G02B 21/36; G02B 21/361; G02B 21/365; G02B 21/367
USPC ....... 359/385, 362, 363, 368, 369, 388, 389, 359/390
See application file for complete search history.

(56) References Cited

U.S. PATENT DOCUMENTS

2015/0077842 A1* 3/2015 Kleppe ................ G02B 21/06 359/380
2017/0227749 A1* 8/2017 Kleppe ................ G02B 21/008
2019/0056580 A1* 2/2019 Kleppe .............. G02B 21/0064

OTHER PUBLICATIONS

Claus B. Müller et al., Image Scanning Microscopy, Physical Review Letters, May 10, 2010, vol. 104, No. 19, APS, USA.
Giulia M.R. De Luca et al., Re-scan confocal microscopy: scanning twice for better resolution, Biomedical Optics Express, Oct. 25, 2013, pp. 2644-2656, vol. 4, No. 11, Optical Society of America, USA.
Colin Sheppard, Super-resolution in confocal imaging, Optik—International Journal for Light and Electron Optics, Feb. 1988, Issue 80, No. 2. Wissenschaftliche Verlagsgesellschaft mbH, Stuttgart, DE.
Roth, S. et al., Optical photon reassignment microscopy (OPRA), Optical Nanoscopy, Oct. 18, 2013, vol. 2, Issue 1, Article 5. Springer.
Ingo Gregor et al., Rapid nonlinear image scanning microscopy, Nature Methods, Oct. 16, 2017, pp. 1087-1089, vol. 14, No. 11, Nature America, USA.
Haoyang Li et al., Method of super-resolution based on array detection and maximum-likelihood estimation, Applied Optics, Dec. 10, 2016, pp. 9925-9931, vol. 55, Issue 35, Optical Society of America, USA.
Zhongzhi Yu et al., Parallel detecting super-resolution microscopy using correlation based image restoration, Optics Communications, Dec. 1, 2017, pp. 139-146, vol. 404, Elsevier B.V.
Antolovic Michel, SPAD imagers for super resolution microscopy, Jan. 23, 2018, Delft University of Technology.
Peronio et al., 32-channel time-correlated-single-photon-counting system for high-throughput lifetime imaging, Review of Scientific Instruments, Aug. 2017, vol. 88, Issue 8, 083704, AIP Publishing.
Marco Castello et al., Image scanning microscopy with a quadrant detector, Optics Letters, Nov. 15, 2015, pp. 5355-5358, vol. 40, Issue 22, OSA Publishing.

* cited by examiner

TIME-RESOLVED IMAGING METHOD WITH HIGH SPATIAL RESOLUTION

CROSS-REFERENCE TO RELATED APPLICATIONS

This application is a National Phase Application of PCT International Application No. PCT/IB2019/050595, having an International Filing Date of Jan. 24, 2019 which claims priority to Italian Application No. 102018000001891 filed Jan. 25, 2018, each of which is hereby incorporated by reference in its entirety.

FIELD OF THE INVENTION

The present invention refers to optical microscopy techniques.

BACKGROUND OF THE INVENTION

Optical microscopy is one of the most powerful analytical tools in life sciences because it allows the three-dimensional morphology of living samples (from cells to tissues, organs to animals) to be visualized with high spatial-time resolution. When combined with fluorescence, optical microscopy (fluorescence optical microscopy) may provide high molecular specificities and sensitivities that allow biomolecular processes that occur in living samples to be understood. In effect, fluorescent molecules (known as fluorophores) may be bound with high specificity to biomolecules of interest (e.g. proteins) within the sample, due to numerous protocols and labeling methods. An optical microscope focuses light on the sample to induce the fluorescence phenomenon and visualize only the biomolecules of interest. Fluorescence is the process by which a fluorophore, after being excited by the absorption of a photon (SPE) with a certain energy, emits a photon having a lower energy (spontaneous emission). In Multi-Photon Excitation (MPE) the energy needed to excite the fluorophore is obtained by "simultaneous" absorption of multiple photons of lesser energy. The optical microscope, spectrally separating the fluorescent light generated by the biomolecules of interest from the scattered/reflected light, provides a specific and highly sensitive three-dimensional map of the biomolecules of interest.

In addition, fluorophores may be used as sensors to extract other important information about the biomolecule of interest. For example, fluorescence may be used to investigate the characteristics of the environment in which a biomolecule is placed or to understand its proximity to other biomolecules. In many cases, this may be achieved by measuring the so-called average fluorescence lifetime. When in an excited state, a fluorophore has several pathways to become de-excited (including spontaneous emission or fluorescence); consequently, the time a fluorophore passes into the excited state is a stochastic process. The average time spent by the fluorophore in the aforesaid excited state is indicated as the average lifetime of the excited state (or average fluorescence lifetime). The presence of other molecules in the vicinity of the fluorophore may change the rate (or instant probability) of the de-excitation pathway, and thus the average lifetime of the fluorophore. Therefore, by monitoring the average lifetime of a fluorophore, it is possible, in general, to detect (indirectly) the presence of other molecules (e.g. for pH detection). Another option is to use the Resonance Energy Transfer (FRET) mechanism to measure the nanometric distance between two fluorophores (one donor and one acceptor). For example, FRET is extensively used to measure structural macromolecular changes by binding donor and acceptor fluorophores to different subunits of the macromolecule: changes in structure result in a change in the distance between donor and acceptor and, as a result, a change in the average lifetime of the donor. Time-correlated single-photon counting (TCSPC) is one of the most common methods for measuring the average lifetime of the excited state; this class of experiments is also referred to as time-resolved measurement. A pulsed laser is used to excite the fluorophores at a well-defined time position and to provide a synchronization signal to a data acquisition device. The same device records the signal provided by the detector after collecting a fluorescent photon. Due to the laser synchronization signal, the data acquisition device measures the time delay between the excitation event and the photon recording, the so-called photon arrival time. The operation is repeated several times to construct the so-called histogram of photon arrival times. The average lifetime of the fluorophore may be extracted from such a histogram by means of an ad-hoc analysis, which in most cases is based on a fitting routine or a phasor transformation. Since the most common fluorophores (organic or fluorescent proteins) have an average lifetime of between 1 and 10 ns, the components of a TCSPC apparatus must satisfy certain time constraints: (i) the excitation pulses must have a small amplitude (about a hundred ps); (ii) the detector must record the single photon with a high time resolution, i.e. with a low time jitter (uncertainty) (a few hundred ps); (iii) the data acquisition device must provide the delay between the synchronization signal and the signal of the detector with a high time resolution (less than 100 ps).

The fluorescence confocal laser scanning microscope (CLSM) is a specific implementation of the fluorescence optical microscope that offers several important advantages over the wide-range fluorescence microscope (WFM), such as optical sectioning, increased penetration and high time resolution. In a CLSM, a laser beam capable of exciting the fluorophore (by single photon or multiphoton excitation) is focused by the lens on the sample, generating an excitation volume limited by diffraction. The light of fluorescence emitted by the fluorophores within such volume is collected by the same lens and recorded by a single-point/element detector. A pinhole, positioned before the detector and in a plane optically conjugated with the system's image plane, acts as a spatial filter that blocks out-of-focus fluorescent light and reduces the microscope's effective observation volume (relative to the excitation volume). Point-by-point scanning of such observation volume on the sample permits the reconstruction of images representing an optical section of the sample (optical sectioning capacity) with lateral spatial resolution beyond the diffraction limit.

When only the total amount of the fluorescent signal (or fluorescent photons) is recorded, the CLSM provides an intensity image. Since the fluorescent signal is proportional to the concentration of fluorophores in the excitation volumes associated with each pixel, the intensity image provides a concentration map of the fluorophores in the sample.

The CLSM may be combined with a time-correlated single-photon counter (TCSPC) to provide both an intensity image and a time-resolved image. A time-resolved image is a three-dimensional image in which the third axis represents the histograms of arrival time for the fluorescence photons recorded in the pixel. Clearly, the intensity images may be obtained from the time-resolved image by integration into the third dimension. Given the time-resolved image, it is possible to reconstruct the map of the average lifetime of the excited state of the sample, the so-called fluorescence lifetime image (FLI microscopy, FLIM), by applying a fitting or a phasor analysis.

In terms of spatial resolution, the CLSM was the first method capable of exceeding the limit imposed by light diffraction. Specifically, it theoretically offers an improvement of the resolution by a factor of ~1.4 relative to the conventional WFM: using visible light and a lens with a high numerical aperture, the CLSM offers a resolution of ~140 nm instead of ~200 nm. Unfortunately, such improvement of resolution may only be achieved with an ideal aperture (pinhole) having infinitesimally small dimensions, which would result in a large decrease in the signal level; consequently, a relatively larger pinhole is always used to obtain images with an acceptable signal level at the expense of spatial resolution. Image Scanning Microscopy (ISM) offers a solution to such a problem. In essence, such a technique allows one to achieve an improvement in resolution of 1.4 without sacrificing the signal. Image scanning microscopy was theoretically proposed by Bertero, Pike and Sheppard [1,2] and represents the first attempt to overcome the compromise between resolution and signal in the CLSM; basically, it consists of an upgrade of the standard CLSM where the single point/element detector is replaced with a two-dimensional array of detectors, placed in a conjugated image plane, and the imaging is performed in an open pinhole configuration to avoid signal loss. To preserve the optical sectioning, one usually uses a pinhole the size of which, projected on the object plane, corresponds to 1 Airy unit. The final high-resolution image with high signal-to-noise ratio is obtained by combining (in post-processing) the images acquired individually by the detector array at each excitation point of the sample. Recently, the ISM has been implemented with a two-dimensional optical sensor (e.g. CCD or CMOS) or with a rounded input fiber bundle, the cores of which at one end of the fiber (input) are placed following a well-known two-dimensional geometry and at the other end (output) are sealed in a linear array of detectors.

The technical features of an ISM system, such as its effective spatial resolution, its temporal imaging resolution, its versatility and its compatibility with all other advanced methods of fluorescence microscopy, particularly with fluorescence lifetime imaging, depend on two key aspects: (i) the technical features of the detector matrix used for the ISM implementation and (ii) the computational method used to generate the final images.

In conventional laser scanning microscopy, the idea of replacing a single point/element detector with an imaging detector (detector array) that takes an intensity image of the emitted light for each excitation point of the sample was initially proposed by Bertero and Pike in [1]. For each scanning position of the sample, they proposed to "invert" the two-dimensional array (image) obtained from the detector array. The inversion of the array is achieved by using a singular value decomposition (SVD) of the linear operator that describes the process of image formation in the detector array. The final "improved" image is the mosaic obtained by merging all the arrays obtained from the SVD inversion. Subsequently, Sheppard in [2] described the same equipment and proposed so-called pixel reassignment (PR) strategies to obtain the final high-resolution image. Essentially, each individual element of the detector array produces a translated image of the sample. The final image is obtained by (i) translating conversely all the images produced by each detector element by half of the distance of the detector element (which produces the image) from the central element (scaling of the system's magnification); (ii) summing all of the translated images.

The first implementation of the optical architecture proposed by Bertero, Pike and Sheppard is reported in [3]. This was also the first work to introduce the term image scanning microscope (ISM), commonly used to describe such microscopy technique. In this case, a conventional camera was used. Relative to conventional scanning microscopy that uses fast single-point/element detectors, such as photomultiplier tubes (PMT), avalanche photodiodes (APD) or single-photon avalanche diodes (SPAD), such implementation significantly reduces the imaging time resolution (low frame-rate, i.e. low number of images per second): the entire image (or part of it) must be read (by the computer) before moving the lighting point to a different region of the sample. Furthermore, such a camera-based implementation (CCD or CMOS) is not compatible with a TCSPC technique to obtain a time-resolved image from which a FLIM image is reconstructed.

To improve the imaging time resolution (frame-rate), fully optical camera-based ISM alternatives have been implemented [4,5]; however, these increase the complexity of the architecture, since they require a complete re-design of the system (optical and/or electronic). Such implementations do not require calculations to reconstruct the high-resolution intensity image, because the method of reassigning the pixels (shift and sum) is obtained by re-scanning the fluorescence beam and integrating the fluorescent signal made by the camera during exposure. However, since "raw" data is no longer produced, it is no longer possible to perform post-processing to compensate for misalignments and aberrations. Moreover, the use of CCD or CMOS still precludes combination with the time-resolved technique based on TCSPC.

A further implementation of fully optical camera-based ISM has been proposed, which reduces the complexity of the architecture [6], but still prevents post-processing and combination with TCSPC, and moreover requires non-linear excitation: in this architecture, optical sectioning is achieved using non-linear excitation, because it is not possible to use a pinhole the size of the Airy unit (first Airy disk). In this context, it is important to note that in a conventional ISM implementation, where the detector array records an "image" for each sample position and the high-resolution image is reconstructed computationally, a physical pinhole may be replaced with a virtual pinhole: only a subset of elements close to the central element are used to reconstruct the final, high-resolution image.

Finally, to be mentioned is the so-called Airy Scan implementation released on the market by Zeiss. Such implementation replaces the single-element detector of a conventional scanning microscope with an array of detectors, without variation of the optical architecture; it is compatible with a single photon excitation and requires post-processing to obtain the final, high-resolution image. Specifically, such implementation uses a bundle of 32 fibers with rounded input, the cores of which, at the input, follow a well-known hexagonal geometry and, at the output, are sealed in a linear array of PMTs. The equipment and the computational method (post-processing) used to obtain the final image are described in [7]. The same detector system is also used in [8,9], where the authors described different computational methods to obtain the final image.

None of the aforementioned methods describes the possibility of combining ISM with TCSPC measurement to obtain a time-resolved, high-resolution image from which a FLIM image may be reconstructed.

We begin now to formulate, from a mathematical point of view, the problem that the above-described computational methods attempt to solve to generate a high-resolution intensity image.

Given the array/set of intensity images $$g = g_{i,j}(n)$$

with $i=1, \ldots, M_x$, $j=1, \ldots, M_y$, $ic=\lceil M_x/2 \rceil$, $jc=\lceil M_y/2 \rceil$, $n=(n_x, n_y)$, $n_x=1, \ldots, N_x$, $n_y=1, \ldots, N_y$, collected using a scanning microscope equipped with an array of detectors composed of $M_x \times M_y$ elements (where (ic,jc) denotes the central element of the detector array), the problem of reconstructing a high-resolution image consists in estimating the object (or sample) function f(n). In short, the object/sample function describes (is proportional to) the concentration of fluorophores in the sample point n. It has been shown that the reconstruction of f from the image array g leads to a more faithful estimate of f (i.e. generates a higher resolution intensity image) than the reconstruction of f which is obtained from a series of "identical" confocal images obtained from a single detector element. The main reason for such improvement in resolution is the ability of the detector array to generate many different independent images of the same sample.

Using a continuous notation, the process of image formation or direct operator (forward), i.e. the relationship between $g_{i,j}$ and $f$, is as follows $$g_{i,j}(x,y) = (h_{i,j} * f)(x,y)$$

where $h_{i,j}(x,y)$ denotes the point spread function (PSF) associated with the image $g_{i,j}$ and * denotes the convolution operator. Essentially, each image $g_{i,j}$ associated with the element (i,j) of the detector array describes the same object but is collected using a different PSF, which depends on the position of the element (i,j) in the detector array. Since each element of the detector array varies from the others because it is moved in the image plane by fixed values $(s_{i,j}^x, s_{i,j}^y)$, it is possible to write the PSF of each element as a function of the same illumination (or excitation) PSF $h^{exc}$ and the same detection PSF $h^{det}$ $$h_{i,j}(x,y) = h^{exc}(x,y) h^{det}(x - s_{i,j}^x, y - s_{i,j}^y)$$

where it is assumed that the excitation and detection PSFs are co-aligned in the central element of the detector array, i.e. $s_{ic,jc}^x = s_{ic,jc}^y = 0$.

Such equation helps to explain the reconstruction strategy known as pixel reassignment, i.e. the method proposed by Sheppard [2] to obtain a high-resolution image $f_{PR}$ from the image array g. If $h^{exc}$ and $h^{det}$ are considered for simplicity as two identical Gaussian functions, it is clear that $h_{i,j}$ is also a Gaussian function centered exactly halfway between the excitation PSF and the detection PSF. Consequently, each image $g_{i,j}$:

1. differs from the others in terms of signal-to-noise ratio (SNR), whereby the closer the element (i,j) is to the element (ic,jc), the greater the SNR is;
2. is translated (on the image plane) relative to $g_{ic,jc}$ by half of the distance between the element (i,j) and the element (ic,jc), i.e. the drift values are $d_{i,j}^x = s_{i,j}^x/2$ and $d_{i,j}^y = s_{i,j}^y/2$.

With such an assumption, the pixel reassignment method proposes to obtain the high-resolution image by $f_{PR}$: (i) back-translating each image $g_{i,j}$ of the drift values $d_{i,j}^x$ and $d_{i,j}^y$ and (ii) then summing all the images.

A different strategy is to invert the equations by describing the processes of image formation and restoring the sample function f, i.e. solving a problem of image restoration/deconvolution.

In the most general case, $h^{exc}$, $h^{det}$, $s_{i,j}^x$ and $s_{i,j}^y$ are not known a priori, whereby the problem is not only to find an estimate of the object function f, but also an estimate of the excitation PSF $h^{exc}$, the detection PSF $h^{det}$ and the shift matrices $s^x$ and $s^y$. Here, $h^{exc}(n)$ and $h^{det}(n)$ represent the discretization of the continuous functions $h^{exc}$ and $h^{det}$.

Such a problem may be reformulated statistically and turned into a problem of minimization. In particular, assuming that Gaussian noise dominates in the imaging process, the problem becomes the minimization of the mean square error (MSE) functional.

$$J_{MSE}(h^{exc}, h^{det}, s^x, s^y, f \mid g) = \sum_{i,j} \sum_n ((h_{i,j} * f) - g_{i,j})^2$$

with respect to $h^{exc}$, $h^{det}$, $s^x$, $s^y$ and $f$ $$(\tilde{h}^{exc}, \tilde{h}^{det}, \tilde{s}^x, \tilde{s}^y, \tilde{f}) = \arg \min_{h^{exc}, h^{det}, s^x, s^y, f} J_{MSE}(h^{exc}, h^{det}, s^x, s^y, f \mid g).$$

The problem of image restoration/deconvolution in which the object function and the PSFs are simultaneously estimated from the same images is called blind image restoration/deconvolution. The problem of image restoration/deconvolution in which multiple images of the same sample are used to obtain a single solution is called multi-image restoration/deconvolution.

The prior art [7] proposes to minimize the functional $J_{MSE}$ (multi-image blind deconvolution) to estimate the diffusion functions of the excitation point $h^{exc}$ and detection $h^{det}$ but, clearly, the minimization of the functional $J_{MSE}$ also provides an estimate of f.

Alternatively, if one assumes Poissonian noise, the problem becomes the minimization of the so-called Kullback-Leibler (KL) distance functional $$J_{KL}(h^{exc}, h^{det}, s^x, s^y, f \mid g) \triangleq \sum_{i,j} \sum_n \left( g_{i,j} \ln \frac{g_{i,j}}{(h_{i,j} * f)} + (h_{i,j} * f) - g_{i,j} \right)$$

with respect to $h^{exc}$, $h^{det}$, $s^x$, $s^y$ and $f$ $$(\tilde{h}^{exc}, \tilde{h}^{det}, \tilde{s}^x, \tilde{s}^y, \tilde{f}) = \arg \min_{h^{exc}, h^{det}, s^x, s^y, f} J_{KL}(h^{exc}, h^{det}, s^x, s^y, f \mid g).$$

The number of unknown elements $h^{exc}$, $h^{det}$, $s^x$, $s^y$ and f which must be determined is high and may lead to unstable solutions. An approach to reducing the number of unknown elements and thus the instability is represented by the so-called parametric blind image restoration, in which PSFs are parameterized using particular models $h^{det}(\varphi^{det})$ and $h^{exc}(\varphi^{exc})$, and the function $J_{KL/MSE}$ is minimized relative to model parameters.

$$(\tilde{\varphi}^{exc}, \tilde{\varphi}^{det}, \tilde{s}^x, \tilde{s}^y, \tilde{f}) = \arg \min_{\varphi^{exc}, \varphi^{det}, s^x, s^y, f} J_{KL/MSE}(\varphi^{exc}, \varphi^{det}, s^x, s^y, f \mid g).$$

The prior art [7] proposes a parameterization based on Zernike polynomials. Another typical example is to consider the excitation and detection PSFs as circular Gaussian functions $$h^{exc/det}(x, y) = \frac{1}{2\pi\sigma^2_{exc/det}} \exp(-(x^2 + y^2)/(2\sigma^2_{exc/det}))$$

with $\varphi^{exc/det} = \sigma^{exc/det}$. Obviously, other models may be used.

However, even after parameterization of the PSFs, the number of unknown elements is still too high and may lead to instability in the solution; in practice, it may introduce artifacts in the restored image.

In the prior art [8] a method for estimating f from g is proposed, which combines pixel reassignment and image restoration. In this case, the pixel reassignment image $f_{PR}$ is first obtained using theoretical values for $d_{i,j}{}^x$ and $d_{i,j}{}^y$ based on the physical geometry of the detector array and the microscope magnification. Subsequently, an algorithm of single image reconstruction/deconvolution is applied on the image $f_{PR}$ using a theoretical PSF $h_{PR}$ obtained using the same principle of the method of reassignment of the pixels: (i) a theoretical model is used to obtain the PSF $h_{i,j}$ associated with each image, (ii) then each PSF $h_{i,j}$ is shifted by the values $d_{i,j}{}^x$ and $d_{i,j}{}^y$ previously used to obtain $f_{PR}$, (iii) finally, all the PSFs to obtain $h_{PR}$ are summed. In the subsequent work of the same group [9], the shift values $d_{i,j}{}^x$ and $d_{i,j}{}^y$ are estimated directly from the image array g: to estimate the shift matrices $d^x$ and $d^y$ a correlation is used in the spatial domain, which involves a high computational effort and does not provide the possibility of obtaining sub-pixel shift values. In addition, such methods use a single-image, and not multi-image, deconvolution approach. It is important to remember that the multi-image deconvolution approach provides a more robust solution than the single-image deconvolution approach, because it allows one to better explore the different information contained in the frequency domain of each individual image.

SUMMARY OF THE INVENTION

An object of the present invention is to make available a solution that allows both time-resolved images and intensity images to be reconstructed.

Another object of the invention is to make available an image reconstruction method that is less affected by instability than the methods discussed above.

For this object, the invention concerns a method of operation of a point laser scanning microscope, comprising
  scanning a sample with a focused illumination laser beam;
  recording, by means of an array of detecting elements optically conjugated with the focal point of the illumination laser beam, a plurality of images of the sample during a scan by the laser beam, wherein each (i,j) of said detecting elements generates a detection signal for each of different positions n of the illumination beam on the sample, from which, with the scan of the sample, a respective image of the sample is produced, and wherein said detecting elements are configurable in an intensity mode, in which the recorded images are intensity images $g_{i,j}(n)$ related to photons collected during an entire dwell time of the illumination beam on the individual position n, or in a time-resolved mode, in which the recorded images are time-resolved images $g_{i,j}{}^t(n, t)$, in which the collected photons are discriminated based on their times of arrival to the individual detecting elements;
  if the detecting elements are configured in the time-resolved mode, calculating a plurality of intensity images $g_{i,j}(n)$, by integrating the plurality of time-resolved images over time $g_{i,j}{}^t(n, t)$;
  calculating a fingerprint image a by summing the plurality of intensity images $g_{i,j}(n)$ over all the positions n of the illumination beam on the sample, said fingerprint image depending simultaneously on the illumination point-spread function, hereinafter illumination PSF, $h^{exc}$, and on the detection point-spread function, hereinafter detection PSF, $h^{det}$,
  estimating shift matrices $s^x$ and $s^y$ from the intensity images $g_{i,j}(n)$,
  reconstructing at least one of:
  i) a time-resolved object function $f^t$, based on the plurality of time-resolved images $g_{i,j}{}^t(n, t)$, the fingerprint image a and the shift matrices $s^x$ and $s^y$, and
  ii) an intensity object function f, based on the plurality of intensity images $g_{i,j}(n)$, the fingerprint image a and the shift matrices $s^x$ and $s^y$, or by integrating the time-resolved object function $f^t$ over time, and,
  visualizing at least one of a high-resolution time-resolved image $f^{t\sim}$ and a high-resolution intensity image $f^\sim$, based on said time-resolved object function and intensity object function.

BRIEF DESCRIPTION OF THE DRAWINGS

Features and advantages of the proposed method and microscope system will be presented in the following detailed description, which refers to the accompanying drawings, given only as a non-limiting example, wherein:

FIGS. 1a-1c are perspective diagrams that represent three embodiments of a spectrometer according to the invention;

DETAILED DESCRIPTION

Figure 1:
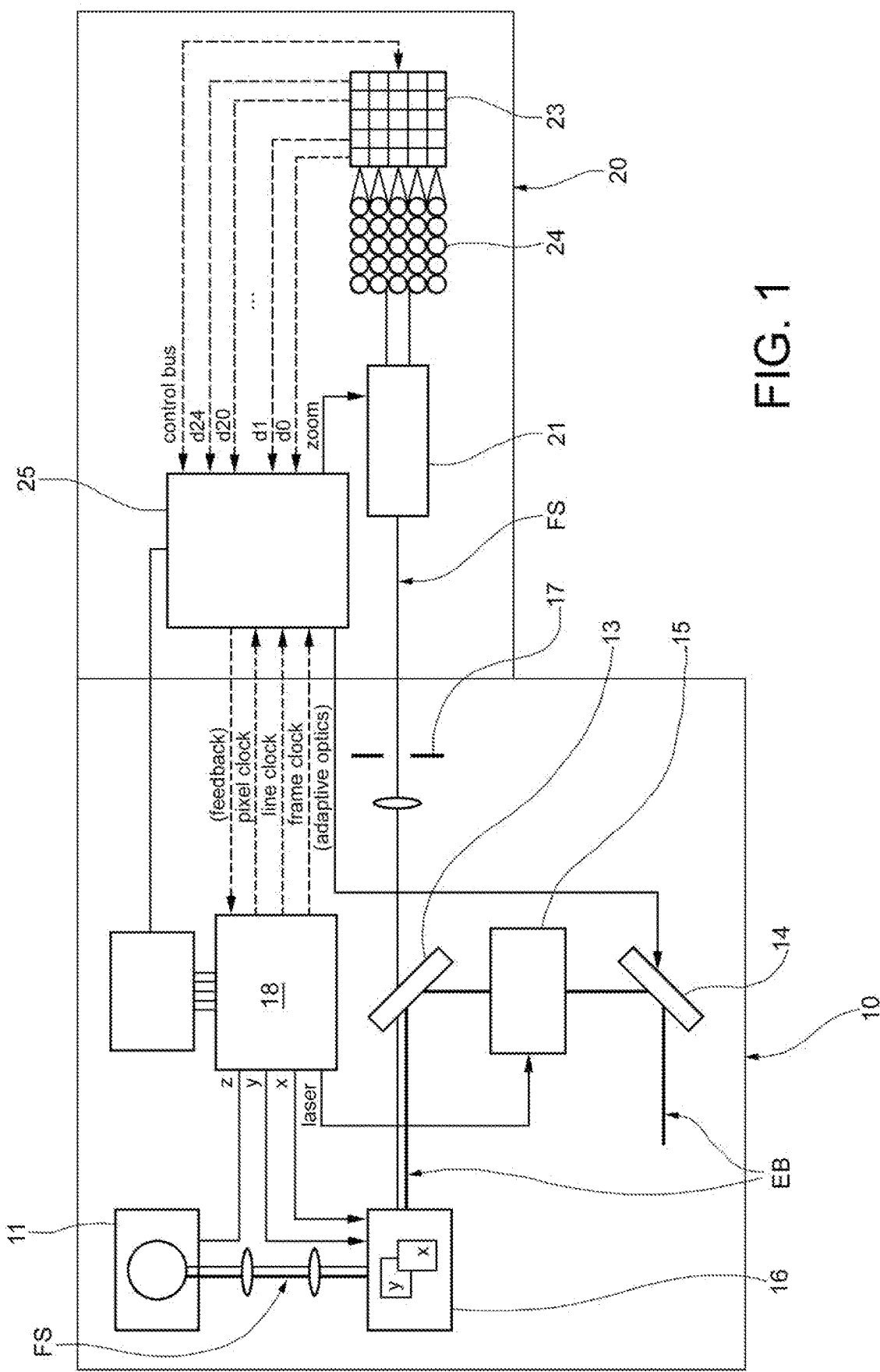
FIG. 1 shows a functional representation of a microscope according to the invention.

With reference to FIG. 1, a laser scanning microscope device configured to obtain the set of data from which the time-resolved image and/or the high-resolution intensity image is extracted is now described. In summary, the apparatus comprises a main unit 10, conventional per se, and a detection module 20. A single or multi-photon excitation beam EB is generated by a laser source (not illustrated) and reflected towards a lens 11 by a dichroic mirror 13. The excitation beam is focused on an object to be analyzed (not shown) by means of the lens 11. A spatial light modulator, made as a micro-mirror device, is indicated at 14, while an acousto-optical modulator (AOM) or electro-optical (EOM) modulator is indicated at 15. A device to scan the object to be analyzed, made, for example, as a galvanometric mirror, is indicated at 16. The fluorescence signal FS emitted by the object is collected by the same lens 11 and transmitted through the dichroic mirror 13 and through a confocal pinhole 17 toward the detection module 20. The pinhole 17 may be fully opened (diameter>>1 Airy unit) when necessary.

The detection module 20 essentially comprises a zoom lens system 21 and an array of detector elements 23, together with the control electronics 25 thereof. Each of the detector elements of the array 23 may be a SPAD detector or a detector with similar temporal performance.

The zoom lens 21 combines the pinhole plane 17 (which is positioned in an image plane of the microscope system) with the plane where the detector array 23 is positioned. The function of the zoom lens 21 is to control the physical size of the projected detection PSF in the image plane (or in the conjugate image plane) where the detector array 23 is positioned. In other words, the zoom lens 21 controls the physical size of the fluorescence diffraction spot generated by a single point fluorescent source positioned in the object plane and of which the image on the detector array 23 is formed. Essentially, the zoom lens 21 controls the system's magnification in the image plane where the detector array 23 is positioned. Such magnification is chosen in such a way that (i) the size of each individual detector element, projected onto the detection plane, is much smaller than one Airy unit, and (ii) most of the fluorescent light is collected by the detector array 23. Obviously, such two requirements must be balanced when using a detector array with a relatively small number of detector elements.

The introduction of the zoom lens 21, instead of a much simpler fixed magnification telescope, is preferable to preserve the generality of the system, e.g. to work with different wavelengths and different lenses.

The detector array 23 is represented by an array (two-dimensional) of $M_x \times M_y$ detector elements, each of which is independent (fully parallel system), has a sensitivity at the level of a single photon and has a time resolution (low time jitter) such as to measure the average fluorescence lifetime of the most common fluorophores used in fluorescence microscopy. The operating parameters of the detector array (excess bias voltage, hold-off time and the number of active elements) may be adjusted before each measurement.

Figure 2:
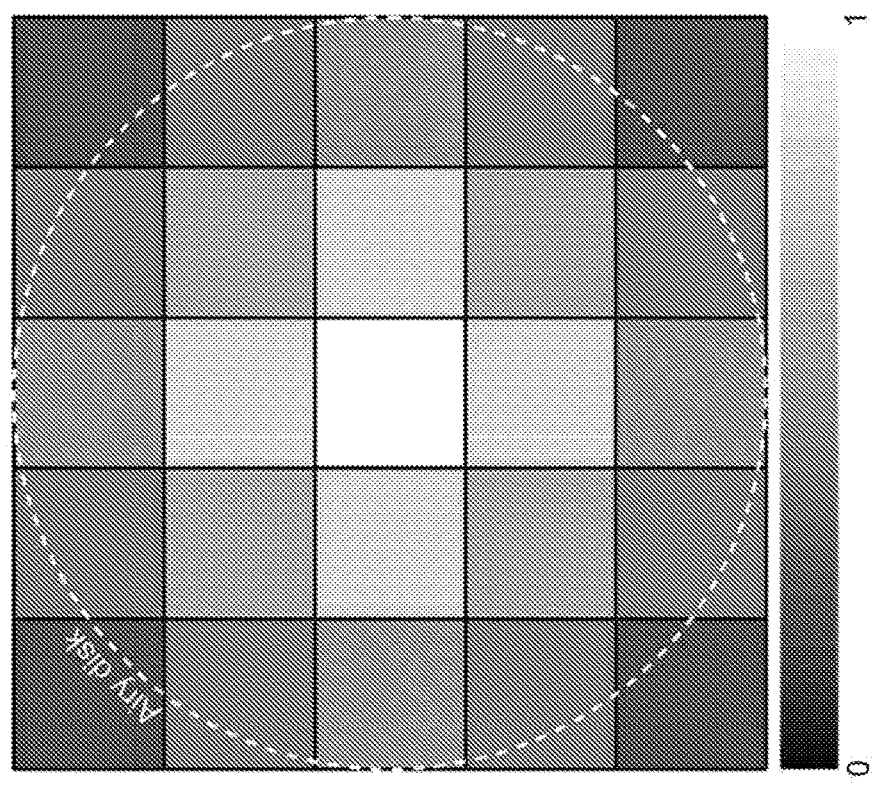
FIG. 2 shows a schematic representation of a detector of the microscope in FIG. 1 (left) and a fingerprint image (right)
Figure 2:
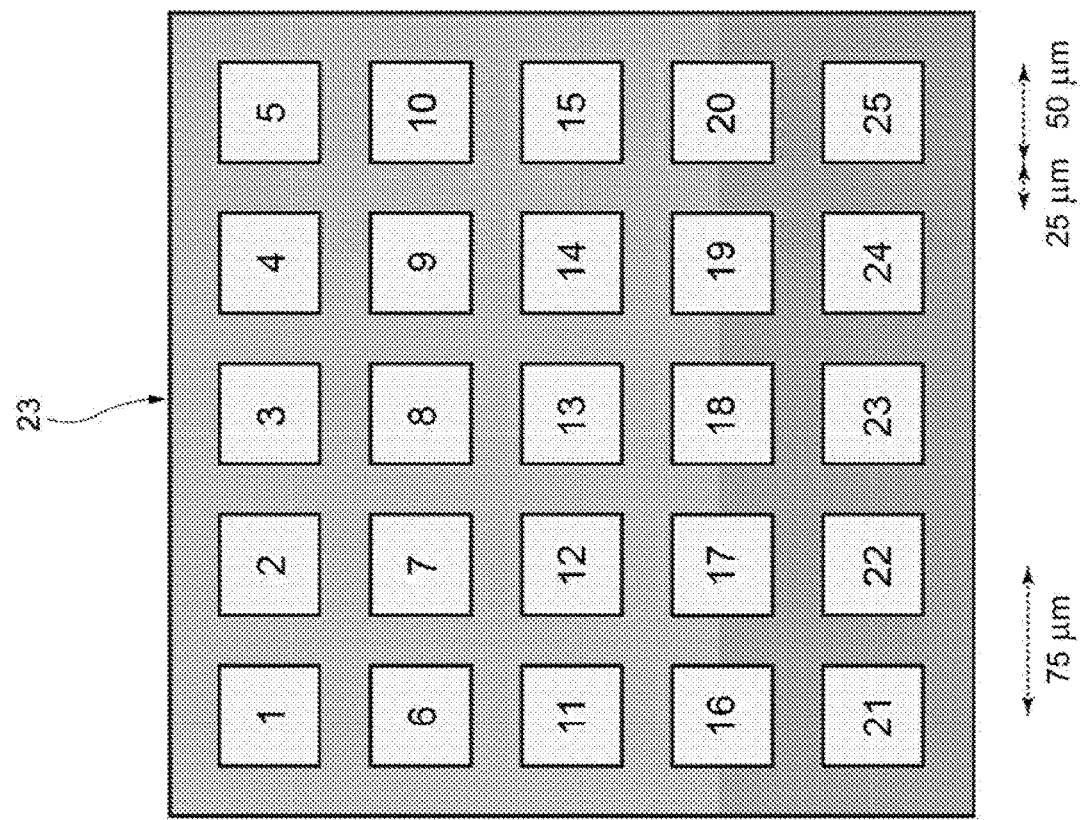

Each element of the detector array 23 has an active square area (other shapes may be used), surrounded by an inactive frame (FIG. 2, left). Similar to other pixel-based devices, the pixel pitch may be defined as the distance between (the baricenters of) two adjacent pixels (if the pixel is square these pixels lie on the same line or in the same column). An important feature of the detector is the fill factor which may be calculated as the ratio between the active area and the square of the pixel pitch. The overall photon detection efficiency (PDE) of the detector, i.e. the probability that a photon reaching the detector is recorded, is directly dependent on the fill factor. To further improve the PDE, an array of microlenses 24 is used to direct the photons towards the center of each detector element. Each element of the detector array signals the arrival of a photon with a TTL (transistor-transistor logic) signal on a dedicated digital channel. Three additional digital lines form a communication bus that is useful for the initial configuration of the entire array during the start of the measurement.

The control electronics and data acquisition of the detection module 20 are developed with a field-programmable gate array (FPGA) processor. This allows one to integrate all the photons collected during the dwell time on the single point n (intensity mode) or to measure the arrival times relative to an external reference signal (e.g. the pulse of the excitation laser) due to the on-board integration of time-digital converters (TDC) (time-resolved mode or TCSPC).

It is important to note that the detector and data acquisition electronics are configured to operate in a completely asynchronous manner, i.e. when a photon is detected, is counted or its arrival time is measured, and the elements are independent of each other, without a limited frame-rate or the inconveniences of a sequential reading.

Communication (synchronization) with the microscope control system (indicated at 18 in FIG. 1) is carried out by means of digital pixel/line/frame clock lines, supplied by the manufacturer.

Before describing the method according to the invention, it is necessary to introduce image formation in the case of time-resolved imaging.

Using a continuous formulation, the direct operator describing the image formation for the time-resolved case is the following $$g_{i,j}{}^t(x,y,t)=f^t(x,y,t)*_{2D}h_{i,j}(x,y)$$

where $f$ is the object function that also includes the time information, i.e. the distribution/probability of emitting a fluorescent photon after a certain time from the excitation event. Convolution is applied only on the spatial dimension.

Step 1. Record the Time-Resolved Image Series/Array (or TCSPC)$g^t$ with the Architecture Described Above.

For different positions of the focused excitation laser beam (single-photon or multi-photon) on the sample, the signals generated by the elements of the detector array 23 are read, and the series/array of time-resolved images is obtained $g^t$ $$g^t = g_{i,j}{}^t(n,t)$$

with i=1, ..., $M_x$, j=1, ..., $M_y$, ic=⌈$M_x$/2⌉, jc=⌈$M_y$/2⌉, n=($n_x$, $n_y$), $n_x$=1, ..., $N_x$, $n_y$=1, ..., $N_y$, t=1, ..., $N_t$.

Essentially, each image $g_{i,j}{}^t$(n, t) is a three-dimensional array where the temporal axis t shows the histogram of the photon arrival time obtained with the TCSPC measurement, i.e., the number of photons collected in a spatial pixel ($n_x$, $n_y$) and in a certain time window (time container) t by the excitation event.

Step 2. Calculate the Series of Intensity Images g from $g^t$

Given the TCSPC image array $g^t$ collected with the equipment described above in TCSPC mode, the array is integrated into the time dimension and the intensity image array g is obtained $$g_{i,j}(n) = \sum_t g_{i,j}^t(n, t)$$

Step 3. Calculate the "Fingerprint" Image a

Given the intensity image array g, the so-called "fingerprint" image a is calculated, from which the excitation PSF $h^{exc}$ and the detection PSF $h^{det}$ are estimated.

The fingerprint image a is defined as follows. All the photons collected by each detector element during an entire measurement are integrated, producing the fingerprint image a. In practice, images are obtained during a single experiment $M_x \times M_y$, and the fingerprint image a is produced by summing all the intensity image values per image:

$$a(i,j) = \sum_n g_{i,j}(n)$$

To understand the properties of the fingerprint image a and how to obtain the PSF therefrom, it is important to derive a in the continuous domain.

Considering a detector array composed of infinitesimal elements, one observes that the image $g_{x',y'}$ acquired by an element at the position $(x', y') \in \mathbb{R}^2$ may be expressed as $$g_{x',y'}(x,y) = (h_{x',y'} * f)(x,y)$$

where $f$ is the object/sample function, $h_{x',y'}$ denotes the PSF associated with the detector element in the position $(x', y')$ and * denotes the convolution operator; the fingerprint image $a(x', y')$, defined with respect to the detector coordinates, is $$a(x',y') = \iint_{x,y} g_{x',y'}(x,y) dxdy = \iint_{x,y} (h_{x',y'} * f)(x,y) dxdy.$$

Applying the convolution integration property, the fingerprint image is $$a(x', y') = \iint_{x,y} h_{x',y'}(x,y) dxdy \cdot \iint_{x,y} f_{x',y'}(x,y) dxdy = \Phi \iint_{x,y} h_{x',y'}(x,y) dxdy$$

where $\Phi$ is the total flow of photons from the sample. Note that $a(x', y')$ is independent of the sample in the condition $\Phi > 0$ ($\Phi \gg 0$) but is closely related to the PSF of the microscope system.

Remembering that the PSF of each infinitesimal element is $$h_{x',y'}(x,y) = h^{exc}(x,y) \cdot [h^{det}(x,y) * \delta(x-x', y-y')]$$

$$= h^{exc}(x,y) \cdot h^{det}(x-x', y-y')$$

and by replacing in the previous equation, it is possible to obtain $$a(x',y') = \Phi \iint_{x,y} h^{exc}(x,y) \cdot h^{det}(x-x', y-y') dxdy = (h^{exc} \star h^{det})(x',y')$$

where $\star$ denotes the correlation operator. In summary, the fingerprint image is dependent on the instrument and not dependent on the sample. In addition, it depends on both the excitation PSF and the detection PSF.

Note that the fingerprint image may also be used to align the system. In particular, to co-align the excitation PSF and the detection PSF on the central pixel (ic,jc) of the detector array. This procedure is very important for a detector with a small number of elements. A misalignment produces a loss of fluorescence photons. If the system is correctly aligned, the central pixel is the brightest and the pixel intensity values are distributed symmetrically and isotropically relative to the center. A feedback control system may be implemented that measures the fingerprint image and thus adjusts the detector's xy position accordingly to maximize the intensity of the central pixel.

In addition, the fingerprint image may be used as a figure of merit to continuously adapt optical elements (adaptive optics, AO) such as spatial light modulators (SLM) or deformable mirrors (DM) and compensate for optical aberrations introduced by the sample or the microscope system during the focusing of the laser beam or the fluorescence beam.

Step 4. Estimate the Shift Matrices $s^x$ and $s^y$, the Drift Matrices $d^x$ and $d^y$, and the Magnification of the Microscope Magn Given the array of the intensity images g, the shift matrices $s^x$ and $s^y$ are calculated.

As described for the pixel reassignment method, each image $g_{i,j}$ is translated (in the image plane) relative to $g_{ic,jc}$ by half the distance between the element (i,j) and the element (ic,jc), i.e. $d_{i,j}^x = s_{i,j}^x/2$ and $d_{i,j}^y = s_{i,j}^y/2$. Thus, the shift matrices $s^x$ and $s^y$ may be estimated by recovering the shift between the different images $g_{i,j}$. Unlike in the prior art [9], a phase correlation method is used for its noise resilience and higher speed than algorithms in the spatial domain. The phase correlation estimates the shift between two similar images relying on a representation of the data in the frequency domain, which in the present description is obtained by fast Fourier transforms (FFT).

To calculate the phase correlation between the two different sample images ($g_{i,j}$ and $g_{ic,jc}$), the so-called correlogram is first defined $r_{i,j}$:

$$r_{i,j} = FFT^{-1}\left(\frac{FFT(g_{i,j})FFT(g_{ic,jc})^*}{|FFT(g_{i,j})FFT(g_{ic,jc})^*|}\right)$$

subsequently, the maximum of the correlogram is found, the position of which denotes the drift between the two images:

$$(d^x(i,j), d^y(i,j)) = \text{argmax}_{(n_x, n_y)}(r_{i,j}(n))$$

The maximum position is obtained using a fitting algorithm or a centroid-based algorithm to obtain sub-pixel values, where $d^{x/y}(i,j) \in \mathbb{R}$.

Given the drift matrices $d^x$ and $d^y$, the shift matrices $s^x$ and $s^y$ may be calculated as follows $$s^{x/y} = d^{x/y} \times 2$$

Other approaches that estimate shift matrices use: (i) a theoretical model, based on the physical distance between the detector elements and the system magnification, (ii) a calibration sample, e.g. spheres.

However, such approaches do not allow the particularities of each sample and the conditions of the specific measurement to be taken into account. Moreover, sample magnification is not always easy to estimate. On the other hand, the above-described approach is sensitive to the assumption of Gaussian form for the excitation PSF and the detection PSF. However, for (i,j) within the first Airy disk centered in (ic,jc), the assumption is solid and the estimate of $s^{x/y}(i,j)$ is robust. An optimal approach could integrate in the estimation of the maximum of the correlogram some constraints based on knowledge related to the geometric shape of the detector and the magnification of the system.

The magnification Magn of the system may be determined using the $s^{x/y}(ic,jc)$ values estimated for the first-order neighbors ($\mathcal{N}$) of the element (ic,jc), i.e., (ic+1,jc), (ic−1, jc), (ic,jc+1) and (ic,jc−1), together with the pixel pitch of the detector (PP) and the pixel dimension of the image (DP):

$$\text{Magn} = \frac{4 \cdot PP}{DP \cdot \sum_{(i,j) \in \mathcal{N}(ic,jc)} \sqrt{(s^x(i,j)^2 + s^y(i,j)^2)}}$$

Step 5. Calculate the Time-Resolved Object Function $f^t$.

Given the array of time-resolved images $g^t$, the fingerprint image a and the shift matrices $s^x$, $s^y$, an estimate of the object function $f^t$ is calculated as described below (steps 5.1-5.3).

Step 5.1. Estimate the Excitation PSF $h^{exc}$ and the Detection PSF $h^{det}$

Based on the relationship with the fingerprint image a described above, the excitation PSF $h^{exc}$ and the detection PSF $h^{det}$ may be estimated according to the minimization problem $$(\tilde{h}^{exc}, \tilde{h}^{det}) = \operatorname{argmin}_{h^{exc}, h^{det}} J_{MSE}(h^{exc}, h^{det} | a)$$

or $$(\tilde{\varphi}^{exc}, \tilde{\varphi}^{det}) = \operatorname{argmin}_{\varphi^{exc}, \varphi^{det}} J_{MSE}(h^{exc}, h^{det} | a)$$

in the case of a parameterization of PSFs. Here the MSE functional is $$J_{MSE}(h^{exc}, h^{det} | a) = \Sigma_{(i,j)}^{(M_x, M_y)} (a(i,j) - (h^{exc} * h^{det})(i,j))^2$$

The MSE function may be minimized with numerical techniques according to known practices.

Step 5.2. Calculate the Time-Resolved Object Function by Means of Multi-Image Deconvolution (MID).

Since all information concerning PSFs (including shift values) has been previously estimated, the original problem may be solved by using a conventional multi-image deconvolution, in particular by minimizing the Kullback-Leibler distance (KL) or the mean square error distance (MSE).

$$\tilde{f}_{MID}^t = \operatorname{argmin}_{f^t} J_{KL/MSE}(f | \tilde{h}^{exc}, \tilde{h}^{det}, \tilde{s}^x, \tilde{s}^y, g^t).$$

In the time-resolved case, the KL distance is $$J_{KL}(h^{exc}, h^{det}, s^x, s^y, f^t | g^t) = \sum_{i,j} \sum_t \sum_n \left( g_{i,j}^t \ln \frac{g_{i,j}^t}{(h_{i,j} *_{2D} f^t)} + (h_{i,j} *_{2D} f^t) - g_{i,j}^t \right)$$

and the MSE distance is $$J_{MSE}(h^{exc}, h^{det}, s^x, s^y, f^t | g^t) = \sum_{i,j} \sum_t \sum_n ((h_{i,j} *_{2D} f^t) - g_{i,j}^t)^2$$

The MSE or KL functional may be minimized with numerical techniques according to known practices.

Step 5.3. Calculate the Time-Resolved Object Function $f^t$ by Means of Pixel Reassignment (PR).

Following the pixel reassignment approach, a high-resolution time-resolved image may be obtained by simply summing all the images after shifting each image $g_{i,j}^t$ back by the estimated amount $d^{x/y}(i,j)$:

$$\tilde{f}_{PR}^t(n, t) = \sum_{(i,j)}^{(M_x, M_y)} FFT_{2D}^{-1}\left(FFT_{2D}(g_{i,j}^t(n, t)) \exp(-id^x(i,j)n_x) \exp(-id^y(i,j)n_y)\right)$$

Essentially, each 2D image associated with each time container and detector element is shifted independently. For this reason, both the FFT and the reverse FFT are carried out in 2D.

Step 6. Calculate the Intensity Object Function f.

Given: (i) the intensity image array g, the fingerprint image a, and the shift matrices $s^x$, $s^y$ or (ii) the previously estimated time-resolved object function $f^t$, an estimate of the intensity object function f is calculated, as described below (steps 6.1-6.3).

Step 6.1. Calculate the Intensity Object Function f by Time Integration.

Given the high-resolution time-resolved image, it is possible to obtain a high-resolution intensity image by integrating the time dimension of the time-resolved object function $f^t$ in the reconstructed time.

$$\tilde{f}_{MID/PR_{i,j}}(n) = \sum_t \tilde{f}_{MID/PR_{i,j}}^t(n, t)$$

Step 6.2. Calculate the Intensity Object Function f by Means of Multi-Image Deconvolution.

Given the excitation PSF $h^{exc}$, the detection PSF $h^{det}$ and the shift matrices $s^x$, $s^y$, the intensity object function f may be calculated directly from the series of intensity images g by means of multi-image deconvolution and without estimating the time-resolved object function $f^t$, with a substantial reduction in computational effort.

In this case, it is necessary to minimize the KL or MSE distance only with respect to f $$\tilde{f}_{MID} = \operatorname{argmin}_f J_{KL/MSE}(f | \tilde{h}^{exc}, \tilde{h}^{det}, \tilde{s}^x, \tilde{s}^y, g).$$

The MSE or KL functional may be minimized with numerical techniques according to known practices.

Step 6.3. Calculate the Intensity Object Function f by Means of Pixel Reassignment.

Given the shift matrices $s^x$, $s^y$, the intensity object function f may be calculated directly from the series of intensity images g by means of pixel reassignment and without estimating the time-resolved object function $f^t$, with a substantial reduction in computational effort.

In this case, the reassignment estimation of the pixels is $$\tilde{f}_{PR}(n) = \sum_{(i,j)}^{(M_x, M_y)} FFT^{-1}(FFT(g_{i,j}(n))) \exp(-id^x(i,j)n_x) \exp(-id^y(i,j)n_y))$$

If the microscope apparatus operates in the intensity mode (i.e. without taking TCSPC measurements) only the intensity image array g is generated. In this case, only the methods proposed in steps 6.2 and 6.3 may be used. For a laser beam operating in continuous wave mode, the importance of recording the signal in TCSPC mode declines.

The technical advantages of the methods described above are as follows.

Reconstruction of robust (or time-resolved) intensity images without parameters.
The ability to separately estimate the PSFs and the shift matrices and only then estimate the sample function makes the reconstruction method more robust. Estimating the shift matrices using a phase correlation approach allows for sub-pixel results and quick calculations.
fingerprint image.
The correct system setting (in terms of xy alignment) may be achieved by a closed-loop control system (feedback system) that uses the "fingerprint image" as the metric and mechanical elements to move the detector along x and y.

Compatibility with time-resolved measurements.

This allows ISM to be combined with fluorescence-lifetime imaging microscopy (FLIM).

Simple (and possibly automatic) alignment of the system, due to the "fingerprint image".

The main technical advantages of the above-described equipment are as follows.

SPAD Detector Array

The photons are collected from an array of $M_x$ by $M_y$ single photon avalanche diode (SPAD) detectors with photon-level sensitivity (in the example shown the matrix is composed of 25 elements, i.e. $M_x$ times $M_y$ is equal to 5). It may be demonstrated that even with a relatively low number of elements (>=25 elements), the spatial resolution of the reconstructed image (by PR) is close to the theoretical resolution improvement of the closed pinhole confocal microscope. Such consideration is crucial because a large number of detector elements would require 1) tightly integrated electronics, sacrificing the fill factor, and 2) a sequential reading (the same principle as the camera), introducing a frame-rate and discarding the time information at the source.

All the detectors are fully independent of each other: (i) the interference (cross-talk) between the elements is negligible (the SPAD array shows interference values <1% for the first horizontal neighbors and <0.2% for the first diagonal neighbors) and (ii) each element reveals the arrival of a photon immediately with a digital TTL signal on a dedicated line. Devices characterized by the latter property are sometimes referred to as "event-driven cameras" or "asynchronous cameras", because each photon generates a power-on signal and there is no fixed frame rate.

All the detectors have a time jitter (or time resolution) fully compatible with the measurement of the average lifetime of the excited state of the fluorophores most used in fluorescence microscopy, the values of which fall in the range 1-10 ns (the SPAD array has a time resolution between 110 and 160 ps).

All detectors have a hold-off that ensures read bandwidths compatible with fast scanning systems (in the above-described SPAD array, the hold-off time and excess bias voltage may be set with a communication bus in the range of 25 ns to 200 ns, and 4V to 6V, respectively). For example, the ability to set the hold-off to 25 ns allows each individual element to work with a read bandwidth of 40 MHz. Moreover, the independence among all the detector elements allows a higher effective read bandwidth of the detector system: since in the above-described point laser scanning architecture the dimensions of the SPAD array projected on the object plane are smaller than the diffraction dimensions; the photons generated by the observation volume (scanned along the sample) are diffused over the entire detector array, therefore the SPAD array may collect a higher photon flow (generated by the observation volume) than the reading from a single element. This technical feature is particularly important when combining the detector with a fast resonant scanning system, such as resonant mirrors or adjustable focus optics based on acoustic gradients.

An array of $M_x$ by $M_y$ microlenses, in which each lens is focused in the center of an element of the detector array, may be used to increase the fill factor and thus the photon detection efficiency (PDE). A zoom lens system is used to expand the detection beam, so that the size of the entire detector, projected onto the detection plane, is around 1 Airy unit. The zoom lens system guarantees the generality of the architecture described above, in terms of the wavelength used, the magnification and the numerical aperture of the lens.

FPGA processor

The system control electronics were developed using reconfigurable hardware. An FPGA processor allows the signal to be acquired from a sufficient number of digital lines. A time-to-digital converter (TDC) implemented directly on the FPGA processor allows a digital signal to be acquired with a time resolution (time jitter) of tens of picoseconds.

Figure 3:
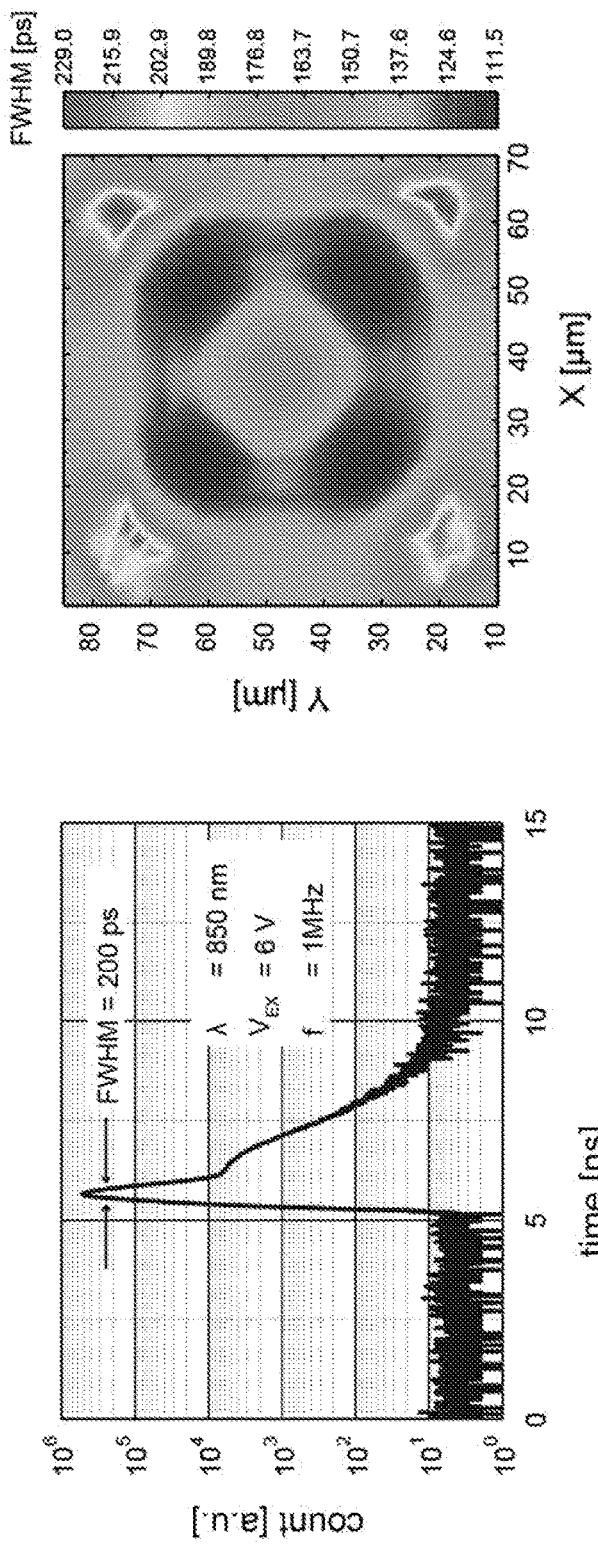
FIG. 3 shows the performance of a prototype according to the invention: time resolution (jitter) of a single detector element (left), time resolution as a function of the location where the photon is collected (center) and normalized efficiency of photon detection within the active area of the detector (right)
Figure 4:
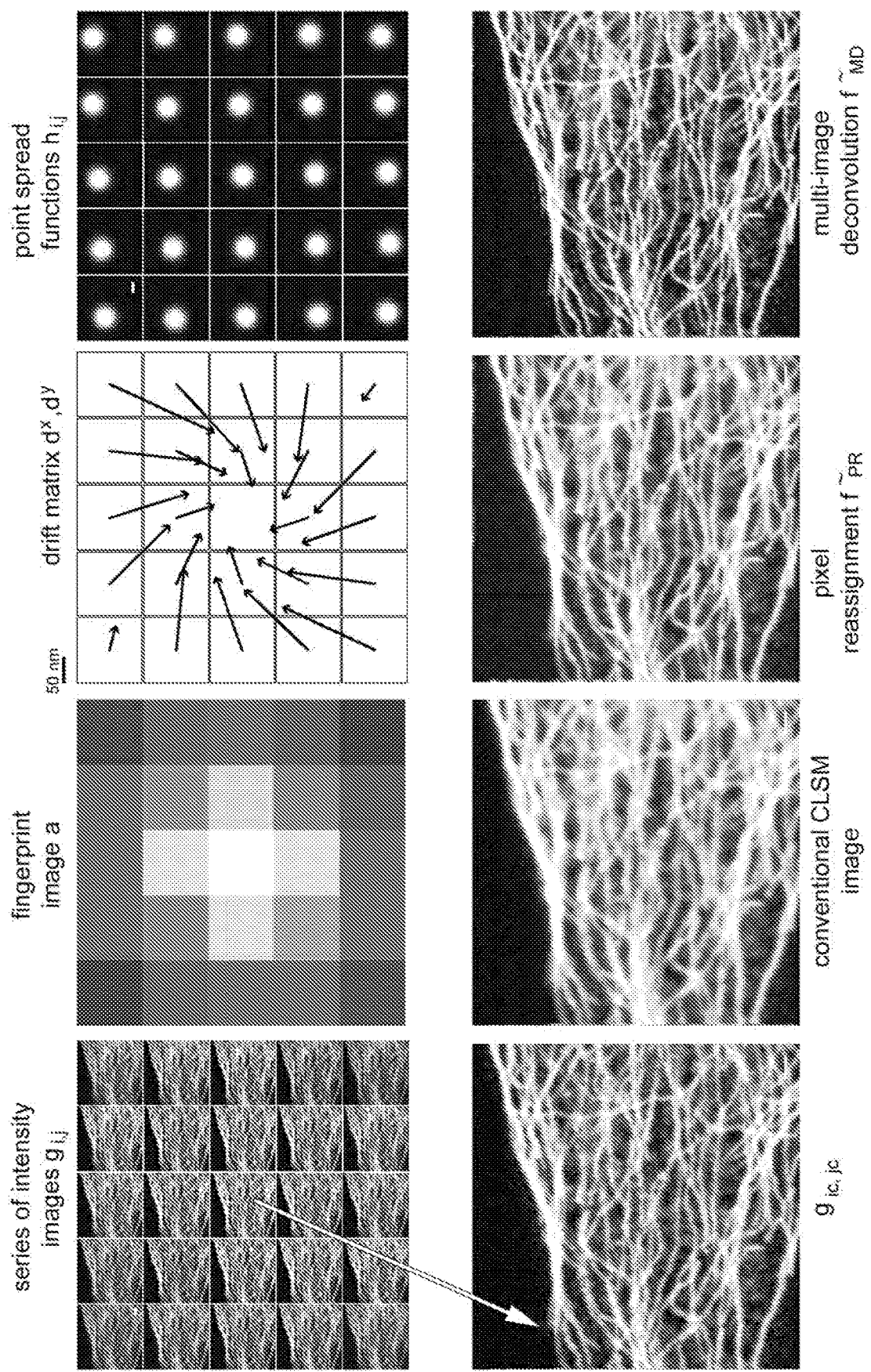
FIG. 4 shows a reconstruction example of a high-resolution intensity image. Top, left to right: a series of intensity images g obtained with a 5-by-5 array of SPAD detectors (scale bar: 1 µm), showing the cytoskeleton of a fixed cell; a fingerprint image a calculated from g; drift matrix $d^x$ and $d^y$ estimated from g; PSF $h_{i,j}$ calculated for each element of the SPAD array (scale bar: 100 nm) obtained from the excitation PSFh$_{exc}$, the detection PSFh$_{det}$, and the estimated shift matrices $s^x$ and $s^y$. Below, from left to right: intensity image recorded from the center pixel $g_{ic,jc}$ (scale bar: 1 µm); conventional CLSM intensity image at low resolution (scale bar: 1 µm); intensity image reconstructed by multi-image deconvolution (scale bar: 1 µm).

A prototype was built by the inventors, modifying the detecting part of a CLSM. The instrument is equipped with an excitation laser source with a wavelength of 635 nm (LDH-D-C640, PicoQuant). The laser beam is scanned on the sample by a pair of galvanometric mirrors (6215HM40B, CTI-Cambridge) and a lens (CFI Plan Apo VC60x oil, Nikon). Fluorescent photons are collected by the same lens, de-scanned and filtered by a dichroic mirror (H643LPXR, AHF Analysentechnik). Finally, the beam is expanded and projected onto the SPAD detector array. The detector array has 25 elements arranged in a 5-by-5 array and is mounted on a commercial support with micrometer screws for fine alignment on the three axes. The spatial and temporal performance of the detector was determined, showing a jitter between 110 and 160 ps within the active area and excellent uniformity of detection (FIG. 3). The system may be aligned, and the magnification adjusted using the "alignment array" method described above, to make images of actual samples (FIG. 4).

The detector array is controlled by a dedicated operating card that provides power and provides electronic signal conditioning. The card provides 25 digital output channels (each linked to the arrival of a photon on a specific element of the detector array), which are entered into the data acquisition system.

The data acquisition system was developed with a commercial FPGA development board (National Instruments USB-7856R), equipped with a Kintex-7 FPGA processor, connected to a personal computer. To synchronize the acquisition system with the microscope control system, standard digital pixel/line/frame clock lines were used.

When the microscope is used for real-time imaging, the photons collected from each pixel by each detector are processed by dedicated algorithms run on graphics processing units (GPUs) to provide real-time high-resolution images of the sample.

Obviously, changes are possible with respect to the system architecture and the use of the methods described above.

For example, even if the number of elements (25, arranged in a 5-by-5 array) was chosen as an optimal compromise between resolution gain and complexity of the acquisition system (each element constitutes a digital channel), the number of elements may be increased to 49 (7-by-7 array) or 81 (9-by-9 array).

In addition, the SPAD-based detection system may be used for other non-fluorescence-based laser point scanning microscopy techniques such as second harmonic generation microscopy, Raman and scattering.

Moreover, the detection system may be used in depletion microscopy by means of stimulated emission depletion (STED) microscopy.

Since the fingerprint image is a direct representation of the illumination and detection PSFs, it is possible to use the fingerprint image to derive a metric to be supplied to an adaptive optics control system (e.g., based on spatial light modulators SLM) to compensate for aberrations induced by the system or sample.

BIBLIOGRAPHICAL REFERENCES

[1] U.S. Pat. No. 4,549,204 A
[2] Super-resolution in confocal imaging. Sheppard, C. J. R., Optik, 80(2), (1988)
[3] Image scanning microscopy. Muller, C. B., Enderlein, J., Phys. Rev. Lett. 104, 198101 (2010)
[4] Optical Photon Reassignment Microscopy (OPRA). Roth, S., Sheppard, C. J. R., Wicker, K., Heintzmann, R., Optical Nanoscopy, 2-5, (2013)
[5] Re-scan confocal microscopy: scanning twice for better resolution. De Luca, G. M. R. et al., Biomedical Optics Express 2014, 4(11)
[6] Rapid nonlinear image scanning microscopy. Gregor, I. et al., Nature Methods 2017, In Press
[7] WO 2015/055534 A1
[8] Method of super-resolution based on array detection and maximum-likelihood estimation. Li, H. et al., Applied Optics 2016, 55(35): 9925-9931
[9] Parallel detecting super-resolution microscopy using correlation-based image restoration. Yu, Z. et al., Optics Communications 2017, 404(35): 139-146

The invention claimed is:

1. A method for operating a point laser-scanning microscope, the method comprising:
scanning a sample with a focused illumination laser beam;
recording, by an array of detecting elements optically conjugated with a focal point of the focused illumination laser beam, a plurality of images of the sample over a scan by the focused illumination laser beam, wherein each detecting element denoted by indexes (i,j) of said array of detecting elements generates a detection signal for each of different positions n of the focused illumination laser beam on the sample, from which with the scan of the sample a respective image of the sample is produced, and wherein said detecting elements are configurable to an intensity mode, in which the recorded images are a plurality of intensity images $g_{i,j}(n)$ related to photons collected during an entire dwell time of the focused illumination laser beam on an individual position n, or to a time-resolved mode, in which the recorded images are a plurality of time-resolved images $g_{i,j}^{t}(n, t)$, in which collected photons are discriminated based on their times of arrival to individual detecting elements;
if the detecting elements are configured to the time-resolved mode, calculating the plurality of intensity images $g_{i,j}(n)$, by integrating the plurality of time-resolved images over time $g_{i,j}^{t}(n, t)$;
independently of whether the detecting elements are configured to the intensity mode or to the time-resolved mode, calculating a fingerprint image a by summing the plurality of intensity images $g_{i,j}(n)$ over all positions n of the focused illumination laser beam on the sample, said fingerprint image depending simultaneously on an illumination point-spread function, hereinafter illumination PSF, $h^{exc}$, and a detection point-spread function, hereinafter detection PSF, $h^{det}$,
independently of whether the detecting elements are configured to the intensity mode or to the time-resolved mode, estimating shift matrices $s^x$ and $s^y$ from the plurality of intensity images $g_{i,j}(n)$,
reconstructing at least one of:
i) a time-resolved object function $f^t$, based on the plurality of time-resolved images $g_{i,j}^{t}(n, t)$, fingerprint image a and shift matrices $s^x$ and $s^y$, and
ii) an intensity object function f, based on the plurality of intensity images $g_{i,j}(n)$, fingerprint image a and shift matrices $s^x$ and $s^y$, or by integrating the time-resolved object function $f^t$ over time, and,
visualizing at least one of a high-resolution time-resolved image $f^{t\sim}$ and a high-resolution intensity image $f^\sim$, based on said time-resolved object function and intensity object function.

2. The method of claim 1, wherein reconstructing the time-resolved object function $f^t$ comprises:
estimating the illumination PSF $h^{exc}$ and the detection PSF $h^{det}$ based on the fingerprint image a, and
estimating the time-resolved object function $f^t$ by multi-image deconvolution.

3. The method of claim 1, wherein reconstructing the time-resolved object function $f^t$ comprises:
calculating the time-resolved object function $f^t$ by pixel reassignment.

4. The method of claim 1, wherein reconstructing the intensity object function f comprises:
estimating the illumination PSF $h^{exc}$ and the detection PSF $h^{det}$ based on the fingerprint image a, and
estimating the intensity object function f by multi-image deconvolution.

5. The method of claim 1, wherein reconstructing the intensity object function f comprises
calculating the intensity object function f by pixel reassignment.

6. The method of claim 1, further comprising:
aligning said array of detecting elements with an optical axis of the point laser-scanning microscope based on the calculated fingerprint image a.

7. The method of claim 1, further comprising:
calculating microscope magnification based on the estimated shift matrices $s^x$ and $s^y$.

8. A point laser-scanning microscope comprising:
a focused illumination laser beam configured to scan a sample; and
an array of detecting elements optically conjugated with the focal point of the focused illumination laser beam, said detecting elements being configured to record a plurality of images of the sample over a scan by the focused illumination laser beam,
wherein the point laser-scanning microscope is configured to carry out the method of claim 1.

9. The point laser-scanning microscope of claim 8, wherein each detecting element is a single-point detector and has a time resolution of the order of magnitude of 100 ps.

* * * * *